United States Patent
Takenaka et al.

(10) Patent No.: US 10,189,974 B2
(45) Date of Patent: Jan. 29, 2019

(54) TIRE

(71) Applicant: SUMITOMO RUBBER INDUSTRIES, LTD., Kobe-shi, Hyogo (JP)

(72) Inventors: Mikako Takenaka, Kobe (JP); Ryoji Kojima, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/292,374

(22) Filed: Oct. 13, 2016

(65) Prior Publication Data

US 2017/0137598 A1    May 18, 2017

(30) Foreign Application Priority Data

Nov. 12, 2015 (JP) ................ 2015-222440

(51) Int. Cl.
| | |
|---|---|
| *C08K 3/36* | (2006.01) |
| *C08L 15/00* | (2006.01) |
| *B60C 1/00* | (2006.01) |
| *C08C 19/25* | (2006.01) |
| *C08J 3/22* | (2006.01) |
| *C08K 3/04* | (2006.01) |
| *C08K 3/06* | (2006.01) |
| *C08K 3/22* | (2006.01) |
| *C08K 5/09* | (2006.01) |
| *C08L 7/00* | (2006.01) |
| *C08L 91/00* | (2006.01) |

(52) U.S. Cl.
CPC .............. *C08K 3/36* (2013.01); *B60C 1/0016* (2013.01); *C08C 19/25* (2013.01); *C08J 3/226* (2013.01); *C08K 3/04* (2013.01); *C08K 3/06* (2013.01); *C08K 3/22* (2013.01); *C08K 5/09* (2013.01); *C08L 7/00* (2013.01); *C08L 15/00* (2013.01); *C08L 91/00* (2013.01)

(58) Field of Classification Search
CPC .................. C08K 3/36; C08L 15/00
See application file for complete search history.

(56) References Cited

U.S. PATENT DOCUMENTS

| | | |
|---|---|---|
| 8,273,804 B2 | 9/2012 | Nishimura |
| 2003/0125474 A1 | 7/2003 | Yatsuyanagi |
| 2010/0032071 A1 | 2/2010 | Miyazaki |
| 2010/0071827 A1 | 3/2010 | Miyazaki |
| 2010/0075161 A1 | 3/2010 | Lindgren et al. |
| 2011/0015302 A1* | 1/2011 | Tanaka ..................... B60C 1/00 523/150 |

FOREIGN PATENT DOCUMENTS

| | | |
|---|---|---|
| DE | 102 28 537 A1 | 1/2003 |
| JP | 2008-221955 A | 9/2008 |
| JP | 2014-80050 A | 5/2014 |
| RU | 2 424 910 C2 | 2/2011 |
| RU | 2 428 439 C2 | 2/2011 |
| RU | 2 461 595 C2 | 4/2011 |

OTHER PUBLICATIONS

Office Action dated Dec. 21, 2017, in Russian Patent Application No. 2016140474/05(064509), with English translation.

* cited by examiner

*Primary Examiner* — Vickey Nerangis
(74) *Attorney, Agent, or Firm* — Birch, Stewart, Kolasch & Birch, LLP

(57) ABSTRACT

A purpose of the present invention is to provide a tire assuring that clogging of snow and sticking of snow are inhibited, particularly a tire assuring that clogging of snow and sticking of snow can be inhibited and having good performance on ice and snow and abrasion resistance without depending on the tread pattern form while maintaining wet grip performance and abrasion resistance. The tire is composed of a rubber composition which comprises a rubber component comprising a modified butadiene rubber and silica and has a pure water contact angle of from 125° to 140°.

2 Claims, No Drawings

TIRE

TECHNICAL FIELD

The present invention relates to a tire composed of a predetermined rubber composition.

BACKGROUND OF THE INVENTION

So far methods of improving grip performance on ice and snow of tires for use in winter such as a studless tire and a snow tire have been proposed, for example, a method of increasing adhesive friction force by decreasing a hardness (Hs) of a rubber composition for a tread, thereby decreasing an elastic modulus at low temperature (improving low temperature property), a method of obtaining a gripping force on an ice- and snow-covered road by providing predetermined sipes on a block surface of a tread, and a method of obtaining a gripping force by providing, on a tread surface, deep lateral grooves for compressing snow and gripping the compressed snow during running.

The sipes provided on a block surface of a tread come into contact with ice and snow on a road, thereby making it possible to exhibit a gripping force. However, when "sticking of snow", which is a phenomenon of snow adhering to a surface of a tread, occurs, there is a problem that the sipes cannot come into contact with snow and ice on a road, thereby making it impossible to exhibit grip performance on ice and snow.

Snow gripped by the lateral grooves is removed until a tire makes one rotation and the lateral grooves come into contact with snow on the road again. Thus, the lateral grooves can exhibit the gripping force repeatedly. However, when "clogging of snow" occurs and snow cannot be removed from the tread, there is a problem that the lateral grooves cannot grip snow, namely on-snow grip performance which the tire has cannot be exhibited.

In order to solve the above-mentioned problems, a method of forming a tread pattern such as lateral grooves into a predetermined shape has been proposed. For example, JP 2008-221955 A discloses a method of inhibiting sticking of snow by forming a tread pattern into a predetermined shape. Further JP 2014-080050 A discloses a method of inhibiting the clogging of snow by designing lateral grooves to have a predetermined shape.

SUMMARY OF THE INVENTION

There is a limit in inhibiting clogging of snow and sticking of snow only by considering a tread pattern shape such as lateral grooves, and further improvement of grip performance on ice and snow is demanded. Furthermore, since a tread pattern shape such as lateral grooves is bound to one being capable of inhibiting clogging of snow and sticking of snow, there is a problem that a degree of freedom in designing of the shape is lowered and that performance on ice and snow, abrasion resistance and wet grip performance are sacrificed.

An object of the present invention is to provide a tire inhibiting clogging of snow and sticking of snow, in particular to a tire inhibiting clogging of snow and sticking of snow without depending on a tread pattern shape and being excellent in performance on ice and snow while wet grip performance and abrasion resistance are maintained.

The present invention relates to a tire composed of a rubber composition comprising a rubber component comprising a modified butadiene rubber and silica and having a pure water contact angle of from 125° to 140°.

It is preferable that an amount of filler gel in the rubber composition is not less than 45% by mass.

It is preferable that the rubber composition comprises a modified butadiene rubber and silica as a masterbatch.

According to the tire composed of the rubber composition comprising the rubber component comprising the modified butadiene rubber and silica and having a pure water contact angle of from 125° to 140°, it is possible to provide a tire inhibiting clogging of snow and sticking of snow.

DETAILED DESCRIPTION

The tire of the present invention is featured by use of the rubber component comprising the modified butadiene rubber and silica and having a pure water contact angle within a predetermined range.

The rubber component comprises the modified butadiene rubber. The modified butadiene rubber is a butadiene rubber having a condensed alkoxysilane compound at an active terminal of the butadiene rubber and is a rubber component being excellent in reactivity with a silane coupling agent and silica. By combination use of this modified butadiene rubber and silica, a hydrophilic group on a surface of the silica is bonded to the modified butadiene rubber, thereby allowing filler gel to be formed to cover the hydrophilic group of the silica, and as a result, water repellency of the rubber composition can be enhanced, that is, a pure water contact angle can be increased.

The modified butadiene rubber is prepared by a preparation method using, as the butadiene rubber, a butadiene rubber obtained by polymerization in the presence of a catalyst composition comprising, as a main component, a mixture comprising the following components (a) to (c), wherein the preparation method comprises a modifying step (A) of performing a modifying reaction by using a butadiene rubber having an active terminal and introducing an alkoxysilane compound having two or more reaction groups including an alkoxysilyl group into the active terminal of the butadiene rubber, and a condensation step (B) of subjecting a residue of the alkoxysilane compound introduced into the active terminal to condensation reaction in the presence of a condensation catalyst having at least one element selected from the group consisting of the elements included in groups 4, 12, 13, 14 and 15 of the Periodic Table.

Component (a): A lanthanoid-containing compound containing at least one element selected from the group consisting of lanthanoids, or a reaction product obtained by a reaction of the lanthanoid-containing compound with a Lewis base.

Component (b): At least one compound selected from the group consisting of aluminoxanes and organoaluminum compounds represented by general formula (1): $AlR^1R^2R^3$. In the general formula (1), $R^1$ and $R^2$ are the same or different and represent a hydrocarbon group having 1 to 10 carbon atoms or hydrogen atom, and $R^3$ is the same as or different from $R^1$ and $R^2$ and represents a hydrocarbon group having 1 to 10 carbon atoms.

Component (c): An iodine-containing compound having at least one iodine atom in its molecular structure.

Namely, the modified butadiene rubber to be used in the present invention can be prepared by performing a modifying reaction for introducing an alkoxysilane compound into the active terminal of the butadiene rubber having cis-1,4 bonds in an amount of 94.0% by mass or more, and then subjecting a residue of the alkoxysilane compound introduced into the active terminal to condensation reaction in the presence of the condensation catalyst having at least one element among the elements included in groups 4, 12, 13, 14 and 15 of the Periodic Table.

Since the modified butadiene rubber is prepared by the mentioned preparation method, fuel efficiency, abrasion resistance and breaking resistance thereof are satisfactory. The rubber composition of the present invention comprises such a modified butadiene rubber, a natural rubber and silica. Therefore, the rubber composition not only has very good processability but also can inhibit increase in hardness at low temperature, and further, a studless tire with a tread (a cap tread in the case of a tread of a multilayer structure) produced using such rubber composition has good performance on ice and snow and abrasion resistance in good balance. Furthermore, a studless tire, in which the rubber composition of the present invention is used for a base tread of an inner layer other than the cap tread, has good performance on ice and snow and durability in good balance.

The modifying step (A) is a step of performing a modifying reaction by using a butadiene rubber having an active terminal and introducing an alkoxysilane compound having two or more reaction groups including an alkoxysilyl group into the active terminal of the butadiene rubber.

The butadiene rubber has an active terminal. The amount of cis-1,4 bonds of the butadiene rubber is preferably 94.0% by mass or more, more preferably 94.6% by mass or more, further preferably 98.5% by mass or more, yet further preferably 99.0% by mass or more. When the amount of cis-1,4 bonds is less than 94.0% by mass, performance on ice and snow, abrasion resistance and breaking resistance of the studless tire produced using the rubber composition comprising the modified butadiene rubber may not be sufficient enough. Herein, the amount of cis-1,4 bonds is a value calculated from a signal strength measured by an NMR analysis.

The above-mentioned butadiene rubber is a polymer of 1,3-butadiene.

For the preparation of the butadiene rubber, the polymerization may be performed using a solvent or in the absence of a solvent. Inactive organic solvents can be used as a solvent (polymerization solvent) to be used for the polymerization, and examples thereof include saturated aliphatic hydrocarbons having 4 to 10 carbon atoms such as butane, pentane, hexane and heptane; saturated alicyclic hydrocarbons having 6 to 20 carbon atoms such as cyclopentane and cyclohexane; monoolefins such as 1-butene and 2-butene; aromatic hydrocarbons such as benzene, toluene and xylene; halogenated hydrocarbons such as methylene chloride, chloroform, carbon tetrachloride, trichloroethylene, perchloroethylene, 1,2-dichloroethane, chlorobenzene, bromobenzene and chlorotoluene; and the like.

A polymerization reaction temperature for preparing the butadiene rubber is preferably from −30° C. to 200° C., more preferably from 0° C. to 150° C. The method of the polymerization reaction is not limited particularly. The polymerization reaction may be performed using a batch type reactor, or may be performed continuously using an apparatus such as a multistage continuous reactor. In the case of using the polymerization solvent, the monomer content in the solvent is preferably from 5 to 50% by mass, more preferably from 7 to 35% by mass. Further, from the viewpoint of efficiency in preparation of the butadiene rubber and from a point that the butadiene rubber having an active terminal is not deactivated, it is preferable that a compound having a deactivating action such as oxygen, water or carbon dioxide gas is not mixed into a polymerization system as far as possible.

Further, the butadiene rubber prepared by polymerization in the presence of the catalyst composition (hereinafter also referred to as a "catalyst") comprising, as a main component, a mixture comprising the following components (a) to (c) is used as the butadiene rubber to be used for the preparation of the modified butadiene rubber in the present invention.

Component (a): A lanthanoid-containing compound containing at least one element selected from the group consisting of lanthanoids, or a reaction product obtained by a reaction of the lanthanoid-containing compound with a Lewis base.

Component (b): At least one compound selected from the group consisting of aluminoxanes and organoaluminum compounds represented by general formula (1): $AlR^1R^2R^3$. In the general formula (1), $R^1$ and $R^2$ are the same or different and represent a hydrocarbon group having 1 to 10 carbon atoms or hydrogen atom, and $R^3$ is the same as or different from $R^1$ and $R^2$ and represents a hydrocarbon group having 1 to 10 carbon atoms.

Component (c): An iodine-containing compound having at least one iodine atom in its molecular structure.

When such a catalyst is used, a butadiene rubber having cis-1,4 bonds in an amount of 94.0% by mass or more is prepared easily. This catalyst is useful for industrial production since the polymerization reaction needs not be performed at a very low temperature and operation is simple.

The component (a) is a lanthanoid-containing compound containing at least one element selected from the group consisting of lanthanoids, or a reaction product obtained by a reaction of the lanthanoid-containing compound with a Lewis base. Among lanthanoids, neodymium, praseodymium, cerium, lanthanum, gadolinium and samarium are preferred. Among these, neodymium is particularly preferred in the preparation method of the present invention. The lanthanoids may be used alone or may be used in combination of two or more thereof. Examples of the lanthanoid-containing compound include carboxylate, alkoxide, β-diketone complex, phosphate, phosphite and the like of lanthanoid. Among these, carboxylate or phosphate is preferred, and carboxylate is more preferred.

Examples of the carboxylate of lanthanoid include salts of carboxylic acid represented by general formula (2): $(R^4—COO)_3M$, wherein M represents lanthanoid, and $R^4$s are the same or different and represent hydrocarbon groups having 1 to 20 carbon atoms. In addition, in the above-mentioned general formula (2), $R^4$ is preferably a saturated or unsaturated alkyl group and is preferably a linear, branched or cyclic alkyl group. Further, a carboxyl group is bonded to a primary, secondary or tertiary carbon atom. Examples include salts of octanoic acid, 2-ethylhexanoic acid, oleic acid, stearic acid, benzoic acid, naphthenic acid, "versatic acid" (brand name of Shell Chemicals, carboxylic acid having a carboxyl group bonded to a tertiary carbon atom), and the like. Among these, salts of versatic acid, 2-ethylhexanoic acid and naphthenic acid are preferred.

Examples of the alkoxide of lanthanoid include those represented by general formula (3): $(R^5O)_3M$, wherein M represents lanthanoid. In the general formula (3), examples of the alkoxyl group represented by "$R^5O$" include a 2-ethyl-hexyl alkoxyl group, an oleyl alkoxyl group, a stearyl alkoxyl group, a phenoxy group, a benzyl alkoxyl group, and the like. Among these, the 2-ethyl-hexyl alkoxyl group and the benzyl alkoxyl group are preferred.

Examples of the β-diketone complex of lanthanoid include an acetyl acetone complex, a benzoyl acetone complex, a propionitrile acetone complex, a valeryl acetone complex, an ethylacetylacetone complex, and the like.

Among these, an acetyl acetone complex and an ethylacetylacetone complex are preferred.

Examples of the phosphate or phosphite of lanthanoid include salts such as bis(2-ethylhexyl)phosphate, bis(1-methylheptyl)phosphate, bis(p-nonylphenyl)phosphate, bis(polyethyleneglycol-p-nonylphenyl)phosphate, (1-methylheptyl) (2-ethylhexyl)phosphate, (2-ethylhexyl)(p-nonylphenyl)phosphate, 2-ethylhexyl phosphonic acid mono-2-ethylhexyl, 2-ethylhexyl phosphonic acid mono-p-nonylphenyl, bis(2-ethylhexyl)phosphinate, bis(1-methylheptyl)phosphinate, bis(p-nonylphenyl)phosphinate, (1-methylheptyl) (2-ethylhexyl)phosphinate, and (2-ethylhexyl)(p-nonylphenyl)phosphinate. Among these, salts of bis(2-ethylhexyl)phosphate, bis(1-methylheptyl)phosphate, 2-ethylhexyl phosphonic acid mono-2-ethylhexyl and bis(2-ethylhexyl)phosphinate are preferred.

Among those mentioned above, a phosphate of neodymium or a carboxylate of neodymium is particularly preferred, and a versatate of neodymium or a 2-ethylhexanoate of neodymium is most preferred, as the lanthanoid-containing compound.

In order to allow the lanthanoid-containing compound to be soluble in a solvent or store the lanthanoid-containing compound stably for a long period of time, it is also preferable to mix the lanthanoid-containing compound and a Lewis base or to react the lanthanoid-containing compound with a Lewis base to obtain a reaction product. An amount of the Lewis base is preferably 0 to 30 mole, more preferably 1 to 10 mole based on 1 mole of lanthanoid. Examples of the Lewis base include acetylacetone, tetrahydrofuran, pyridine, N,N-dimethylformamide, thiophene, diphenyl ether, triethylamine, organophosphorus compounds, monovalent or divalent alcohol, and the like. The above-mentioned components (a) may be used alone or may be used in combination of two or more thereof.

The above-mentioned component (b) is at least one compound selected from the group consisting of aluminoxanes and organoaluminum compounds represented by the general formula (1): $AlR^1R^2R^3$, wherein $R^1$ and $R^2$ are the same or different and represent a hydrocarbon group having 1 to 10 carbon atoms or hydrogen atom, and $R^3$ is the same as or different from $R^1$ and $R^2$ and represents a hydrocarbon group having 1 to 10 carbon atoms.

The above-mentioned aluminoxane (hereinafter also referred to as "alumoxane") is a compound having a structure represented by the following general formula (4) or (5). The aluminoxane may also be an aggregate of alumoxanes disclosed in Fine Chemical 23, (9), 5 (1994), J. Am. Chem. Soc., 115, 4971 (1993), and J. Am. Chem. Soc., 117, 6465 (1995).

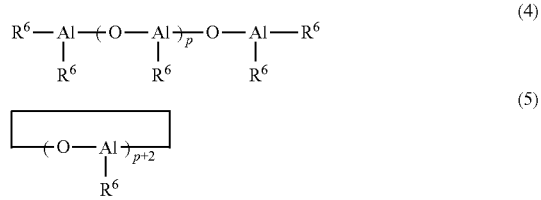

(4)

(5)

In the above formulas (4) and (5), $R^6$s are the same or different, and represent hydrocarbon groups having 1 to 20 carbon atoms. "p" is an integer of 2 or more. Examples of the $R^6$ include a methyl group, an ethyl group, a propyl group, a butyl group, an isobutyl group, a t-butyl group, a hexyl group, an isohexyl group, an octyl group, an iso-octyl group, and the like. Among these, a methyl group, an ethyl group, an isobutyl group and a t-butyl group are preferred, and a methyl group is preferred particularly. Further, the above-mentioned "p" is preferably an integer of from 4 to 100.

Examples of the alumoxane include methyl alumoxane (hereinafter also referred to as "MAO"), ethyl alumoxane, n-propyl alumoxane, n-butyl alumoxane, isobutyl alumoxane, tert-butyl alumoxane, hexyl alumoxane, isohexyl alumoxane, and the like. Among these, MAO is preferred. The alumoxanes can be prepared by a known method, and can be prepared, for example, by adding trialkyl aluminum or dialkyl aluminum monochloride into an organic solvent such as benzene, toluene, xylene or the like, further adding water, steam, steam-containing nitrogen gas, or a salt having water of crystallization, such as copper sulfate pentahydrate, aluminum sulfate hexadecahydrate or the like, and giving rise to a reaction. These alumoxanes may be used alone or may be used in combination of two or more thereof.

Examples of the organoaluminum compound represented by the general formula (1) include trimethyl aluminum, triethyl aluminum, tri-n-propyl aluminum, triisopropyl aluminum, tri-n-butyl aluminum, triisobutyl aluminum, tri-tert-butyl aluminum, tripentyl aluminum, trihexyl aluminum, tricyclohexyl aluminum, trioctyl aluminum, hydrogenated diethyl aluminum, hydrogenated di-n-propyl aluminum, hydrogenated di-n-butyl aluminum, hydrogenated diisobutyl aluminum, hydrogenated dihexyl aluminum, hydrogenated diisohexyl aluminum, hydrogenated dioctyl aluminum, hydrogenated diisooctyl aluminum, ethyl aluminum dihydride, n-propyl aluminum dihydride, isobutyl aluminum dihydride, and the like. Among these, preferred are hydrogenated diisobutyl aluminum, triethyl aluminum, triisobutyl aluminum, or hydrogenated diethyl aluminum, and particularly preferred is hydrogenated diisobutyl aluminum. These organoaluminum compounds may be used alone or may be used in combination of two or more thereof.

The above-mentioned component (c) is an iodine-containing compound having at least one iodine atom in its molecular structure. When such an iodine-containing compound is used, it is possible to easily prepare a butadiene rubber having cis-1,4 bonds content of 94.0% by mass or more. The iodine-containing compound is not limited particularly as far as it has at least one iodine atom in its molecular structure, and examples thereof include iodine, trimethylsilyl iodide, diethylaluminum iodide, methyl iodide, butyl iodide, hexyl iodide, octyl iodide, iodoform, diiodomethane, benzylidene iodide, beryllium iodide, magnesium iodide, calcium iodide, barium iodide, zinc iodide, cadmium iodide, mercury iodide, manganese iodide, rhenium iodide, copper iodide, silver iodide, gold iodide, and the like.

Particularly preferred, as the iodine-containing compound, are silicone iodide compounds represented by general formula (6): $R^7_qSiI_{4-q}$, wherein $R^7$s are the same or different and each represents a hydrocarbon group having 1 to 20 carbon atoms or hydrogen atom, and "q" is an integer of 0 to 3; iodinated hydrocarbon compounds represented by general formula (7): $R^8_rI_{4-r}$, wherein $R^8$s are the same or different and each represents a hydrocarbon group having 1 to 20 carbon atoms, and "r" is an integer of 1 to 3; and iodine. Such silicone iodide compounds, iodinated hydrocarbon compounds and iodine have good solubility in an organic solvent, and therefore, are useful in industrial production, and handling thereof is easy. Namely, the above-mentioned component (c) being at least one iodine-containing compound selected from the group consisting of silicone iodide compounds, iodinated hydrocarbon compounds and iodine is one of preferred embodiments of the present invention.

Examples of the silicone iodide compound (the compound represented by the above-mentioned general formula (6)) include trimethylsilyl iodide, triethylsilyl iodide, dimethylsilyl diiodo, and the like. Among these, trimethylsilyl iodide is preferred. Further, examples of the iodinated hydrocarbon compound (the compound represented by the above-mentioned general formula (7)) include methyl iodide, butyl iodide, hexyl iodide, octyl iodide, iodoform, diiodomethane, benzylidene iodide, and the like. Among these, methyl iodide, iodoform and diiodomethane are preferred.

Among these iodine-containing compounds, particularly preferred are iodine, trimethylsilyl iodide, triethylsilyl iodide, dimethylsilyl diiodo, methyl iodide, iodoform and diiodomethane, and trimethylsilyl iodide is most preferred. The iodine-containing compounds may be used alone or may be used in combination of two or more thereof.

The compounding ratio of each of the components (components (a) to (c)) may be adequately set according to necessity. A compounding amount of the component (a) is preferably from 0.00001 to 1.0 mmol, more preferably from 0.0001 to 0.5 mmol, for example, based on 100 g of a conjugated diene compound. When the compounding amount is less than 0.00001 mmol, activation of polymerization may be lowered. When the compounding amount is more than 1.0 mmol, the catalyst concentration increases and a step for ash removal may be required.

When the component (b) is alumoxane, the compounding amount of the alumoxane can be represented by a molar ratio of the "component (a)" to aluminum (Al) contained in the alumoxane. The ratio (molar ratio) of "component (a)": "aluminum (Al) contained in the alumoxane" is preferably 1:1 to 1:500, more preferably 1:3 to 1:250, further preferably 1:5 to 1:200. When the amount of the alumoxane is out of the above-mentioned range, an activity of the catalyst may decrease or a step of removing a residue of the catalyst may be required.

Further, when the component (b) is an organoaluminum compound, the compounding amount of the organoaluminum compound can be represented by a molar ratio of the component (a) to the organoaluminum compound. The ratio (molar ratio) of "component (a)":"organoaluminum compound" is preferably 1:1 to 1:700, more preferably 1:3 to 1:500. When the compounding amount of the organoaluminum compound is out of the above-mentioned range, an activity of the catalyst may decrease or a step of removing a residue of the catalyst may be required.

The compounding amount of the component (c) can be represented by a molar ratio of the iodine atom contained in the component (c) to the component (a). The molar ratio of (iodine atom contained in the component (c))/(component (a)) is preferably from 0.5 to 3.0, more preferably from 1.0 to 2.5, further preferably from 1.2 to 2.0. When the molar ratio of (iodine atom contained in the component (c))/(component (a)) is less than 0.5, an activity of the catalyst in the polymerization may decrease. When the molar ratio of (iodine atom contained in the component (c))/(component (a)) is more than 3.0, the component (c) becomes a poison.

In addition to the above-mentioned catalysts such as the components (a) to (c), it is preferable to compound, according to necessity, preferably not more than 1000 moles, more preferably 3 to 1000 moles, further preferably 5 to 300 moles of at least one compound selected from the group consisting of conjugated diene compounds and un-conjugated diene compounds to 1 mole of the component (a). When the at least one compound selected from the group consisting of conjugated diene compounds and un-conjugated diene compounds is added to the catalyst, an activity of the catalyst is further enhanced, which is preferable. Examples of the conjugated diene compound to be used in this case include 1,3-butadiene, isoprene, and the like in the same manner as in the monomers for polymerization explained hereinafter. Further, examples of the un-conjugated diene compound include divinylbenzene, diisopropenylbenzene, triisopropenylbenzene, 1,4-vinylhexadiene, ethylidene norbornene, and the like.

The catalyst composition comprising, as a main component, a mixture of the above-mentioned components (a) to (c) can be prepared, for example, by reacting the components (a) to (c) dissolved in a solvent and further at least one compound selected from the group consisting of conjugated diene compounds and unconjugated diene compounds to be added according to necessity. An order of adding each of the components for the preparation may be optionally selected. It should be noted that from the viewpoint of improvement of activation of polymerization and shortening of a time period for inducing initiation of the polymerization, it is preferable that the components are subjected to mixing, reaction and maturation previously. The maturing temperature is preferably from 0° C. to 100° C., more preferably from 20° C. to 80° C. When the maturing temperature is lower than 0° C., the maturing tends to be insufficient. On the other hand, when the maturing temperature is higher than 100° C., there is a tendency that an activity of the catalytic decreases and extension of a molecular weight distribution easily occurs. The maturing time is not limited particularly. Before addition into a polymerization reactor, each of the components may come into contact with each other in a production line, and in that case, 0.5 minute or more of the maturing time suffices. The prepared catalyst will be stable for several days.

With respect to the butadiene rubber to be used for preparing the modified butadiene rubber of the present invention, a ratio of a weight-average molecular weight (Mw) to a number-average molecular weight (Mn) thereof measured by gel permeation chromatography, namely a molecular weight distribution (Mw/Mn) is preferably not more than 3.5, more preferably not more than 3.0, further preferably not more than 2.5. When the molecular weight distribution is more than 3.5, physical properties of the rubber such as breaking resistance and low heat build-up property tend to deteriorate. On the other hand, the lower limit of the molecular weight distribution is not limited particularly. Herein, the molecular weight distribution (Mw/Mn) means a value calculated from a ratio of the weight-average molecular weight to the number-average molecular weight (weight-average molecular weight/number-average molecular weight). Here, the weight-average molecular weight of the butadiene rubber is a weight-average molecular weight calculated in terms of polystyrene by a GPC method (Gel Permeation Chromatography method). Further, the number-average molecular weight of the butadiene rubber is a number-average molecular weight calculated in terms of polystyrene by the GPC method.

Furthermore, the vinyl content and the cis-1,4 bonds content of the butadiene rubber can be easily adjusted by controlling the polymerization temperature. Also, the Mw/Mn can be easily adjusted by controlling the molar ratio of the components (a) to (c).

A Mooney viscosity of the butadiene rubber at 100° C. ($ML_{1+4}$ (100° C.)) is preferably within a range of 5 to 50, more preferably within a range of 10 to 40. When the Mooney viscosity is less than 5, mechanical property, abrasion resistance, and the like after the vulcanization may decrease. On the other hand, when the Mooney viscosity is more than 50, there is a case where after the modification reaction, processability at kneading of the modified butadiene rubber decreases. The Mooney viscosity can be easily adjusted by controlling the molar ratio of the components (a) to (c). In addition, the Mooney viscosity ($ML_{1+4}$ (100° C.)) is a value obtained by the measurement method described in the examination explained hereinafter.

Further, a 1,2-vinyl bonds content (an amount of 1,2-vinyl bonds) of the butadiene rubber is preferably not more than 0.5% by mass, more preferably not more than 0.4% by mass, further preferably not more than 0.3% by mass. When the 1,2-vinyl bonds content is more than 0.5% by mass, physical properties of the rubber such as breaking resistance tend to decrease. Further, the amount of the 1,2-vinyl bonds of the butadiene rubber is preferably not less than 0.001% by mass, more preferably not less than 0.01% by mass. Herein, the amount of the 1,2-vinyl bonds is a value calculated from a signal intensity measured by an NMR analysis.

The alkoxysilane compound (hereinafter also referred to as "modifier") to be used for the modifying step (A) is one having two or more reaction groups including an alkoxysilyl group. Kind of the reaction groups other than the alkoxysilyl group is not limited particularly, and preferred examples thereof include at least one functional group selected from the group consisting of (f): an epoxy group, (g) an isocyanate group, (h): a carbonyl group and (i): a cyano group. Namely, the alkoxysilane compound having at least one functional group selected from the group consisting of (f): an epoxy group, (g) an isocyanate group, (h): a carbonyl group and (i): a cyano group is one of preferred embodiments of the present invention. In addition, the alkoxysilane compound may be a partial condensate or may be a mixture of the alkoxysilane compound and the partial condensate.

Here, the "partial condensate" means the alkoxysilane compound in which a part (namely, not the whole) of SiOR (OR represents an alkoxyl group) has been converted to an SiOSi bond by the condensation. It should be noted that in the butadiene rubber to be used for the modification reaction, it is preferable that at least 10% of polymer chains has a living characteristic.

Examples of preferred alkoxysilane compound include alkoxysilane compounds having (f): an epoxy group (hereinafter also referred to as "epoxy group-containing alkoxysilane compound") such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane, and among these, 3-glycidoxypropyltrimethoxysilane and 2-(3, 4-epoxycyclohexyl)ethyltrimethoxysilane are more preferred.

Further, examples of the alkoxysilane compound having (g) an isocyanate group (hereinafter also referred to as "isocyanate group-containing alkoxysilane compound") include 3-isocyanatepropyltrimethoxysilane, 3-isocyanatepropyltriethoxysilane, 3-isocyanatepropylmethyldiethoxysilane, 3-isocyanatepropyltriisopropoxysilane, and the like, and among these, 3-isocyanatepropyltrimethoxysilane is particularly preferred.

Further, examples of the alkoxysilane compound having (h) a carbonyl group (hereinafter also referred to as "carbonyl group-containing alkoxysilane compound") include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane, and the like, and among these, 3-methacryloyloxypropyltrimethoxysilane is particularly preferred.

Further, examples of the alkoxysilane compound having (i) a cyano group (hereinafter also referred to as "cyano group-containing alkoxysilane compound") include 3-cyanopropyltriethoxysilane, 3-cyanopropyltrimethoxysilane, 3-cyanopropylmethyldiethoxysilane, 3-cyanopropyltriisopropoxysilane, and the like, and among these, 3-cyanopropyltrimethoxysilane is particularly preferred.

Among the above-mentioned modifiers, particularly preferred are 3-glycidoxypropyltrimethoxysilane, 2-(3,4-epoxycyclohexyl)ethyltrimethoxysilane, 3-isocyanatepropyltrimethoxysilane, 3-methacryloyloxypropyltrimethoxysilane and 3-cyanopropyltrimethoxysilane, and most preferred is 3-glycidoxypropyltrimethoxysilane. These modifiers may be used alone or may be used in combination of two or more thereof. Furthermore, partial condensates of the above-mentioned alkoxysilane compounds can also be used.

In the modification reaction of the above-mentioned modifying step (A), an amount of the alkoxysilane compound is preferably 0.01 to 200 mole, more preferably 0.1 to 150 mole based on 1 mole of the component (a). When the amount of the alkoxysilane compound is less than 0.01 mole, the modification reaction does not advance sufficiently and improvement of dispersion of the filler is not sufficient. Therefore, after the vulcanization, sufficient mechanical property, abrasion resistance and low heat build-up property may not be obtained. On the other hand, when the alkoxysilane compound is used in an amount exceeding 200 moles, there is a case where the modification reaction has reached a saturated state. In that case, cost for an excess of the alkoxysilane compound used is required. A method of adding the modifier is not limited particularly. Examples of the method include a method of batch-wise addition, a method of divided addition, a method of continuous addition, and the like, and among these, a method of batch-wise addition is preferred.

The modification reaction is performed preferably in a solution, and the solution including an unreacted monomer used for the polymerization can be used as it is. Further, a mode for the modification reaction is not limited particularly, and the modification reaction may be performed using a batch type reactor, or may be performed continuously using a continuous multistage reactor, an inline mixer, or the like. It is preferable to perform the modification reaction after the completion of the polymerization reaction and before desolvation treatment, water treatment, heat treatment, operations necessary for isolation of a polymer, and the like.

A temperature of the modification reaction can be the same as the polymerization temperature for polymerizing the butadiene rubber. Specifically the modification reaction temperature is preferably 20° to 100° C., more preferably 30° to 90° C. When the temperature is lower than 20° C., a polymer viscosity tends to increase, and when the temperature is more than 100° C., an active terminal of the polymer may be deactivated.

Furthermore, a reaction time of the modification reaction is preferably from five minutes to five hours, more preferably from 15 minutes to one hour. In the condensation step (B), after introducing a residue of the alkoxysilane compound into the active terminal of the polymer, a known antioxidant and a reaction inhibitor may be added as desired.

In the modifying step (A), it is preferable to further add, in addition to the modifier, one which is subject to condensation reaction with the residue of the alkoxysilane compound being the modifier introduced into the active terminal and thereby is consumed in the condensation step (B). Specifically it is preferable to add a functional group-introducing agent. This functional group-introducing agent can enhance abrasion resistance of the modified butadiene rubber.

The functional group-introducing agent is not limited particularly as far as a direct reaction with the active terminal does not arise substantially and the agent remains as an unreacted product in the reaction system. Examples of a preferred functional group-introducing agent include alkoxysilane compounds different from the alkoxysilane compound to be used as the modifier, namely alkoxysilane compounds having at least one functional group selected from the group consisting of (j): an amino group, (k): an imino group and (l): a mercapto group. The alkoxysilane compound to be used as the functional group-introducing agent may be a partial condensate or may be a mixture of an alkoxysilane compound which is not a partial condensate of the alkoxysilane compound to be used as the functional group-introducing agent with the partial condensate.

Examples of the functional group-introducing agent include alkoxysilane compounds having (j): an amino group (hereinafter referred to as "amino group-containing alkoxysilane compounds") such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl (triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane, 3-(N-methylamino) propyltriethoxysilane, 3-(1-pyrrolidinyl)propyl(triethoxy)silane, 3-(1-pyrrolidinyl)propyl(trimethoxy)silane, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N, N-dimethylaminobenzylidene)-3-(triethoxysilyl)-1-propaneamine, N-(cyclohexylidene)-3-(triethoxysilyl)-1-propaneamine, and trimethoxysilyl compounds, methyldiethoxysilyl compounds, ethyldiethoxysilyl compounds, methyldimethoxysilyl compounds or ethyldimethoxysilyl compounds corresponding to the mentioned triethoxysilyl compounds. Among these, 3-diethylaminopropyl(triethoxy) silane, 3-dimethylaminopropyl(triethoxy)silane, 3-aminopropyltriethoxysilane, N-(1-methylpropylidene)-3-(triethoxysilyl)-1-propaneamine and N-(1,3-dimethylbutylidene)-3-(triethoxysilyl)-1-propaneamine are particularly preferred.

Further, examples of the preferred functional group-introducing agent include alkoxysilane compounds having (k): an imino group (hereinafter referred to as "imino group-containing alkoxysilane compounds") such as 3-(1-hexamethyleneimino)propyl(triethoxy)silane, 3-(1-hexamethyleneimino)propyl(trimethoxy)silane, (1-hexamethyleneimino)methyl(triethoxy)silane, (1-hexamethyleneimino)methyl(trimethoxy)silane, 2-(1-hexamethyleneimino)ethyl(triethoxy)silane, 2-(1-hexamethyleneimino)ethyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, N-(3-isopropoxysilylpropyl)-4,5-dihydroimidazole and N-(3-(methyldiethoxysilylpropyl)-4,5-dihydroimidazole. Among these, 3-(1-hexamethyleneimino) propyl(triethoxy)silane, 3-(1-hexamethyleneimino) propyl(triethoxy)silane, (1-hexamethyleneimino)methyl(trimethoxy)silane, 1-[3-(triethoxysilyl) propyl]-4,5-dihydroimidazole, 1-[3-(trimethoxysilyl) propyl]-4,5-dihydroimidazole and N-(3-(triethoxysilylpropyl)-4,5-dihydroimidazole are more preferred.

Further, examples of the functional group-introducing agent include alkoxysilane compounds having (1): a mercapto group (hereinafter referred to as "mercapto group-containing alkoxysilane compounds") such as 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, mercaptophenyltriethoxysilane, and the like, and among these, 3-mercaptopropyltriethoxysilane is particularly preferred.

Among these functional group-introducing agents, particularly preferred are 3-diethylaminopropyl(triethoxy)silane, 3-dimethylaminopropyl(triethoxy) silane, 3-aminopropyltriethoxysilane, 3-(1-hexamethyleneimino) propyl (triethoxy)silane, N-(1-methylpropylidene)-3-(triethoxysilyl)-1-propaneamine, N-(1,3-dimethylbutylidene)-3-(triethoxysilyl)-1-propaneamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, N-(3-(triethoxysilylpropyl)-4,5-dihydroimidazole and 3-mercaptopropyltriethoxysilane, and most preferred is 3-aminopropyltriethoxysilane. These functional group-introducing agents may be used alone or may be used in combination of two or more thereof.

When the above-mentioned alkoxysilane compounds are used as the functional group-introducing agent, an amount thereof is preferably from 0.01 to 200 moles, more preferably from 0.1 to 150 moles based on one mole of the component (a). When the amount is less than 0.01 mole, the condensation reaction does not proceed sufficiently, and improvement of dispersion of the filler is not sufficient. Therefore, mechanical property, abrasion resistance and low heat build-up property after the vulcanization may be inferior. On the other hand, when the alkoxysilane compound is used in an amount exceeding 200 moles, there is a case where the condensation reaction is in a saturated state. In that case, cost of an excess of the compound used is required.

A timing of adding the functional group-introducing agent is preferably after having introduced the residue of the alkoxysilane compound into the active terminal of the butadiene rubber in the modifying step (A) and before initiating the condensation reaction in the condensation step (B). If the functional group-introducing agent is added after initiation of the condensation step, there is a case where the functional group-introducing agent is not dispersed uniformly and catalytic performance is lowered. Specifically the timing of adding the functional group-introducing agent is preferably five minutes to five hours after the initiation of the modification reaction, more preferably 15 minutes to one hour after the initiation of the modification reaction.

When the alkoxysilane compound having the above-mentioned functional group is used as the functional group-introducing agent, the butadiene rubber having an active terminal is subject to modification reaction with the modifier added to the reaction system in a substantially stoichiometric amount, and as a result, alkoxysilyl groups are introduced into substantially all of the active terminals. Then, by further adding the functional group-introducing agent, the residues of the alkoxysilane compound more than the equivalent amount of the active terminal of the butadiene rubber are introduced.

It is preferable from the viewpoint of reaction efficiency that the condensation reaction between the alkoxysilyl groups occurs between the free alkoxysilane compound and the alkoxysilyl group at the terminal of the butadiene rubber or in some cases, between the alkoxysilyl groups at the terminals of the butadiene rubber. The reaction between the free alkoxysilane compounds is not preferred. Therefore, when adding another alkoxysilane compound as the functional group-introducing agent, it is preferable that hydrolyzability of an alkoxysilyl group thereof is lower than that of the alkoxysilyl group introduced into the terminal of the butadiene rubber.

For example, preferred is a combination of the use of a highly hydrolyzable alkoxysilane compound having a trimethoxysilyl group as the alkoxysilane compound to be used for the reaction with the active terminal of the butadiene rubber with the use of an alkoxysilane compound having an alkoxysilyl group (e.g., triethoxysilyl group) and being lower in hydrolyzability than that of the trimethoxysilyl group-containing compound as the alkoxysilane compound to be further added as the functional group-introducing agent. On the contrary, for example, when a compound having a triethoxysilyl group is used as the alkoxysilane compound to be used for the reaction with the active terminal of the butadiene rubber and the alkoxysilane compound to be further added as the functional group-introducing agent is a compound having a trimethoxysilyl group, reaction efficiency may be lowered.

The condensation step (B) is a step of subjecting the residue of the alkoxysilane compound introduced into the active terminal to condensation reaction in the presence of a condensation catalyst having at least one element selected from the group consisting of elements included in groups 4, 12, 13, 14 and 15 of the Periodic Table.

The condensation catalyst is not limited particularly as far as it is one having at least one element selected from the group consisting of elements included in groups 4, 12, 13, 14 and 15 of the Periodic Table. The condensation catalyst is preferably one having at least one element selected from the group consisting of titanium (Ti) (group 4), tin (Sn) (group 14), zirconium (Zr) (group 4), bismuth (Bi) (group 15) and aluminum (Al) (group 13).

Example of the condensation catalyst having tin (Sn) include tin bis(n-octanoate), tin bis(2-ethylhexanoate), tin bis(laurate), tin bis(naphthenate), tin bis(stearate), tin bis(oleate), dibutyltin diacetate, dibutyltin di-n-octanoate, dibutyltin di-2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate), di-n-octyltin bis(2-ethylhexylmaleate), and the like.

Example of the condensation catalyst having zirconium (Zr) include tetraethoxy zirconium, tetra-n-propoxy zirconium, tetra-i-propoxy zirconium, tetra-n-butoxy zirconium, tetra-sec-butoxy zirconium, tetra-tert-butoxy zirconium, tetra(2-ethylhexyloxide)zirconium, zirconium tributoxystearate, zirconium tributoxyacetylacetonate, zirconium dibutoxybis(acetylacetonate), zirconium tributoxyethylacetoacetate, zirconium butoxyacetylacetonatebis(ethylacetoacetate), zirconium tetrakis(acetylacetonate), zirconium diacetylacetonatebis(ethylacetoacetate), zirconium oxide bis(2-ethylhexanoate), zirconium oxide bis(laurate), zirconium oxide bis(naphthate), zirconium oxide his (stearate), zirconium oxide bis(oleate), zirconium oxide bis(linolate), tetrakis (2-ethylhexanoate)zirconium, tetrakis(laurate)zirconium, tetrakis(naphthate)zirconium, tetrakis(stearate) zirconium, tetrakis(oleate)zirconium, tetrakis(linolate) zirconium, and the like.

Example of the condensation catalyst having bismuth (Bi) include bismuth tris(2-ethylhexanoate), bismuth tris(laurate), bismuth tris(naphthate), bismuth tris(stearate), bismuth tris(oleate), bismuth tris(linolate), and the like.

Example of the condensation catalyst having aluminum (Al) include triethoxyaluminum, tri-n-propoxyaluminum, tri-i-propoxyaluminum, tri-n-butoxyaluminum, tri-sec-butoxyaluminum, tri-tert-butoxyaluminum, tri (2-ethylhexyloxide)aluminum, aluminum dibutoxystearate, aluminum dibutoxyacetylacetonate, aluminum butoxybis(acetylacetonate), aluminum dibutoxyethylacetoacetate, aluminum tris (acetylacetonate), aluminum tris(ethylacetoacetate), aluminum tris(2-ethylhexanoate), aluminum tris(laurate), aluminum tris(naphthate), aluminum tris(stearate), aluminum tris(oleate), aluminum tris(linolate), and the like.

Example of the condensation catalyst having titanium (Ti) include tetramethoxytitanium, tetraethoxytitanium, tetra-n-propoxytitanium, tetra-i-propoxytitanium, tetra-n-butoxytitanium, a tetra-n-butoxytitanium oligomer, tetra-sec-butoxytitanium, tetra-tert-butoxytitanium, tetra(2-ethylhexyloxy) titanium, bis(2-ethylhexyloxy) titanium bis (octanediolate), titanium tetra-(octanediolate), titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatobis(ethylacetoacetate), titanium tributoxyacetylacetonate, titanium dibutoxybis(acetylacetonate), titanium tributoxyethylacetoacetate, titanium butoxyacetylacetonatobis (ethylacetoacetate), titanium tetrakis(acetylacetonate), titanium diacetylacetonatobis(ethylacetoacetate), titanium oxide bis(2-ethylhexanoate), titanium oxide bis(laurate), titanium oxide bis(naphthate), titanium oxide bis(stearate), titanium oxide bis(oleate), titanium oxide bis(linolate), titanium tetrakis (2-ethylhexanoate), titanium tetrakis(laurate), titanium tetrakis(naphthate), titanium tetrakis(stearate), titanium tetrakis(oleate), titanium tetrakis(linolate), and the like.

Among these, the condensation catalysts having titanium (Ti) are more preferred as the condensation catalyst. Among the condensation catalysts having titanium (Ti), alkoxides, carboxylates and acetylacetonato complex salts of titanium (Ti) are further preferred. Particularly preferred is tetra-i-propoxytitanium (tetraisopropyltitanate). The use of the condensation catalysts having titanium (Ti) can effectively accelerate the condensation reaction of the residue of the alkoxysilane compound used as the modifier with the residue of the alkoxysilane compound used as the functional group-introducing agent, thereby making it possible to obtain a modified butadiene rubber having good processability, low temperature property and abrasion resistance. Thus, the condensation catalyst having titanium (Ti) is also one of preferable embodiments of the present invention.

With respect to an amount of the condensation catalyst, the number of moles of the above-mentioned compounds to be used as the condensation catalyst is preferably 0.1 to 10 mole, particularly preferably 0.3 to 5 mole based on 1 mole of the total amount of the alkoxysilyl groups being present within the reaction system. When the number of moles is less than 0.1 mole, the condensation reaction may not advance sufficiently. On the other hand, even if the condensation catalyst is used in an amount exceeding 10 moles, there is a case where an effect of the condensation catalyst is saturated, and in such a case, extra cost of the condensation catalyst is required.

While the condensation catalyst can be added before the modification reaction, the timing of the addition is preferably after the modification reaction and before initiating the condensation reaction. If the condensation catalyst is added before initiating the modification reaction, a direct reaction with the active terminal may occur and in some cases, an alkoxysilyl group may not be introduced into the active terminal. Further, when the condensation catalyst is added after initiation of the condensation reaction, there is a case where the condensation catalyst is not dispersed uniformly and catalytic performance is lowered. The specific timing of adding the condensation catalyst is preferably five minutes to five hours after initiating the modification reaction, more preferably 15 minutes to one hour after initiating the modification reaction.

The condensation reaction in the condensation step (B) is performed preferably in an aqueous solution, and a condensation reaction temperature is preferably 85° to 180° C., more preferably 100° to 170° C., particularly preferably 110° to 150° C. When the condensation reaction temperature is lower than 85° C., there is a case where the condensation reaction does not proceed sufficiently and cannot be completed. In that case, variation with time may occur on the obtained modified butadiene rubber, resulting in a problem with quality. On the other hand, when the condensation reaction temperature is more than 180° C., there is a case where aging of a polymer may proceed, thereby lowering physical properties of the polymer.

A pH value of an aqueous solution in which the condensation reaction proceeds is preferably 9 to 14, more preferably 10 to 12. When the pH value of the aqueous solution is within the range mentioned above, the condensation reaction is accelerated and stability with time of the modified butadiene rubber can be improved. When the pH value is less than 9, there is a case where the condensation reaction does not proceed sufficiently and cannot be completed. In that case, variation with time may occur on the obtained modified butadiene rubber, resulting in a problem with quality. On the other hand, when the pH value of the aqueous solution in which the condensation reaction proceeds is more than 14, much amount of components derived from alkali remains in the modified butadiene rubber after isolation and removal thereof may be difficult.

The condensation reaction time is preferably five minutes to ten hours, more preferably 15 minutes to 5 hours. When the condensation reaction time is less than five minutes, the condensation reaction may not be completed. On the other hand, when the condensation reaction time is more than ten hours, the condensation reaction may have been saturated.

Further, a pressure in the reaction system during the condensation reaction is preferably 0.01 to 20 MPa, more preferably 0.05 to 10 MPa.

A mode for the condensation reaction is not limited particularly, and the condensation reaction may be performed using a batch type reactor or may be performed continuously using an apparatus such as a continuous multistage reactor. Further, desolvation treatment may be performed at the same time as the condensation reaction.

By performing known post-treatment after the completion of the condensation reaction as mentioned above, the target modified butadiene rubber can be obtained.

A Mooney viscosity ($ML_{1+4}(125°$ C.)) of the modified butadiene rubber is preferably 10 to 150, more preferably 20 to 100. When the Mooney viscosity ($ML_{1+4}(125°$ C.)) is less than 10, physical properties of the rubber including breaking resistance may deteriorate. On the other hand, when the Mooney viscosity ($ML_{1+4}$ (125° C.)) is more than 150, workability may deteriorate, thereby making it difficult to carry out kneading with compounding agents. The Mooney viscosity ($ML_{1+4}$ (125° C.)) is a value obtained by a measurement method described in the examination explained hereinafter.

The molecular weight distribution (Mw/Mn) of the modified butadiene rubber is preferably not more than 3.5, more preferably not more than 3.0, further preferably not more than 2.5. When the molecular weight distribution is more than 3.5, physical properties of the rubber including breaking resistance and low heat build-up property tend to deteriorate. Here, the weight-average molecular weight (Mw) of the modified butadiene rubber is a weight-average molecular weight calculated in terms of polystyrene by a GPC method (Gel Permeation Chromatography method). Further, the number-average molecular weight (Mn) of the modified butadiene rubber is a number-average molecular weight calculated in terms of polystyrene by the GPC method.

Furthermore, a cold flow value (mg/min) of the modified butadiene rubber is preferably not more than 1.0, more preferably not more than 0.8. When the cold flow value is more than 1.0, form stability of the polymer during storage may be lowered. Further, herein the cold flow value (mg/min) is a value calculated by a measuring method explained hereinafter.

Furthermore, an evaluated value of stability with time of the modified butadiene rubber is preferably 0 to 5, more preferably 0 to 2. When the evaluated value is more than 5, variation with time of the polymer may occur during storage thereof. Herein, the stability with time is a value calculated by a measuring method explained hereinafter.

A glass transition temperature of the modified butadiene rubber is preferably not more than −40° C., more preferably not more than −43° C., further preferably not more than −46° C., particularly preferably not more than −50° C. When the glass transition temperature is higher than −40° C., low temperature property necessary for a studless tire may not be secured enough. On the other hand, a lower limit of the glass transition temperature is not limited particularly. Here the glass transition temperature of the modified butadiene rubber can be measured by a measuring method described in Example hereinbelow.

The content of the modified butadiene rubber in the rubber component is preferably not less than 20% by mass, more preferably not less than 30% by mass, further preferably not less than 35% by mass from a viewpoint that performance on ice and snow and abrasion resistance are good. Further, the content of the modified butadiene rubber is preferably not more than 85% by mass, more preferably not more than 75% by mass, further preferably not more than 70% by mass, most preferably not more than 60% by mass.

The rubber component may comprise rubbers other than the modified butadiene rubber. Examples of the other rubber include isoprene diene rubbers such as natural rubber (NR), isoprene rubber (IR), deproteinized natural rubber (DPNR), high purity natural rubber (UPNR) and modified natural rubber; diene rubbers such as butadiene rubber (BR), styrene-butadiene rubber (SBR), styrene-isoprene-butadiene rubber (SIBR), chloroprene rubber (CR) and acrylonitrile-butadiene rubber (NBR); non-diene rubbers such as ethylene-propylene-diene rubber (EPDM), butyl rubber (IIR) and halogenated butyl rubber (X-IIR); and the like. In addition, examples of the modified natural rubber include epoxidized natural rubber (ENR), hydrogenated natural rubber (HNR), grafted natural rubber, and the like.

Among these, it is preferable that the rubber component comprises NR from the viewpoint of good performance on ice and snow and abrasion resistance. NR is not limited particularly, and it is possible to use natural rubbers generally used in the field of tire industry, for example, SIR20, RSS#3, TSR20, and the like. Further, isoprene rubbers generally used in the field of tire industry can also be used.

When compounding the NR in the rubber component, the content thereof is preferably not less than 20% by mass, further preferably not less than 30% by mass, more preferably not less than 35% by mass for the reason that an effect of the present invention can be obtained more effectively. Furthermore, the content of the NR is preferably not more than 80% by mass, more preferably not more than 70% by mass, further preferably not more than 65% by mass, from the viewpoint of low temperature property.

Silica is not limited particularly, and examples thereof include silica prepared by a dry method (anhydrous silica), silica prepared by a wet method (hydrous silica), and the like. For the reason that much silanol groups are contained, silica prepared by a wet method is preferred.

A nitrogen adsorption specific surface area ($N_2SA$) of silica is preferably not less than 80 $m^2/g$, more preferably not less than 100 $m^2/g$, from the viewpoint of durability and elongation at break. Further, from the viewpoint of fuel efficiency and processability, the $N_2SA$ of silica is preferably not more than 250 $m^2/g$, more preferably not more than 220 $m^2/g$. Herein, the $N_2SA$ of silica is a value measured in accordance with ASTM D3037-93.

The content of silica is preferably not less than 5 parts by mass, more preferably not less than 10 parts by mass based on 100 parts by mass of the rubber component, from the viewpoint of durability and elongation at break. Further, the content of silica is preferably not more than 200 parts by mass, more preferably not more than 150 parts by mass, from the viewpoint of improvement of dispersibility at the time of kneading and also from a point of inhibiting lowering of processability due to re-agglomeration of silica during heating at the time of the rolling and during storage after the rolling.

When compounding silica in the rubber component, it is preferable to use a silane coupling agent together with silica. Any of silane coupling agents which have been used in combination with silica in the rubber industry can be used as the silane coupling agent. Examples thereof include sulfide silane coupling agents such as Si75, Si266 (bis(3-triethoxysilylpropyl)disulfide) available from Evonik Degussa GmbH and Si69 (bis(3-triethoxysilylpropyl)tetrasulfide) available from Evonik Degussa GmbH; mercapto silane coupling agents (mercapto group-containing silane coupling agents) such as 3-mercaptopropyltrimethoxysilane, and NXT-Z100, NXT-Z45 and NXT produced by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination of two or more thereof. Among these, sulfide and mercapto silane coupling agents are preferred from the viewpoint of a strong force of bonding with silica and low heat build-up property.

When compounding the silane coupling agent, the content thereof is preferably not less than 2 parts by mass, more preferably not less than 3 parts by mass, based on 100 parts by mass of silica. When the content of the silane coupling agent is less than 2 parts by mass, there is a tendency that an enough effect of improving dispersibility of silica cannot be obtained. Further, the content of the silane coupling agent is preferably not more than 25 parts by mass, more preferably not more than 20 parts by mass. When the content of the silane coupling agent is more than 25 parts by mass, there is a tendency that an effect for the cost cannot be obtained.

In addition to the above-mentioned rubber components and compounding agents, the rubber composition according to the present invention can comprise compounding agents and additives conventionally used in the rubber industry, for example, a reinforcing filler other than silica, zinc oxide, various oils, a softening agent, wax, various anti-oxidants, stearic acid, a vulcanizing agent such as sulfur, various vulcanization accelerators, and the like optionally according to necessity.

Any of various reinforcing agents other than silica can be optionally selected from those having been usually used for rubber compositions for a tire, and from the viewpoint of reinforcing property, carbon black is preferred.

Examples of carbon black include furnace black, acetylene black, thermal black, channel black, graphite, and the like, and these carbon blacks may be used alone or may be used in combination of two or more thereof. Among these, furnace black is preferable for the reason that low temperature property and abrasion resistance can be improved in good balance.

A nitrogen adsorption specific surface area ($N_2SA$) of carbon black is preferably not less than 70 $m^2/g$, more preferably not less than 90 $m^2/g$ from a viewpoint that sufficient reinforcing property and abrasion resistance can be obtained. Further, the $N_2SA$ of carbon black is preferably not more than 300 $m^2/g$, more preferably not more than 250 $m^2/g$ from a viewpoint that dispersion thereof is good and heat generation hardly arises. The $N_2SA$ of carbon black is a value measured according to JIS K 6217-2 "Carbon black for rubber industry—Fundamental characteristics—Part 2: Determination of specific surface area—Nitrogen adsorption methods—Single-point procedures".

When carbon black is compounded, the content thereof is preferably not less than 3 parts by mass, more preferably not less than 4 parts by mass based on 100 parts by mass of the rubber component. When the content of carbon black is less than 3 parts by mass, sufficient reinforcing property tends not to be obtained. Further, the content of carbon black is preferably not more than 200 parts by mass, more preferably not more than 150 parts by mass, further preferably not more than 60 parts by mass. When the content of carbon black is more than 200 parts by mass, there is a tendency that processability is lowered, heat generation occurs easily, and abrasion resistance decreases.

The rubber composition of the present invention can be prepared by known methods, for example, by kneading the above-mentioned components with rubber kneading equipment such as an open roll, a Banbury mixer, an enclosed kneader, or the like and then vulcanizing a resultant kneaded product.

Here, a kneading step for kneading each of the above-mentioned components can be configured to comprise a base kneading step for kneading compounding agents and additives other than vulcanizing agents and vulcanization accelerators with a kneading equipment such as a Banbury mixer, a kneader or an open roll, and a final kneading (F-kneading) step for adding vulcanizing agents and vulcanization accelerators to the kneaded product obtained in the base kneading step and then kneading a resultant mixture. However, from a viewpoint of bonding a hydrophilic group on the surface of silica to the modified butadiene rubber more efficiently for further enhancing water repellency of the rubber composition, it is preferable to divide the above-mentioned base kneading step into an X-kneading step for preparing a masterbatch comprising the modified butadiene rubber and silica and a Y-kneading step for adding the remaining compounding agents and additives other than vulcanizing agents and vulcanization accelerators to the masterbatch and then kneading a resultant mixture.

The masterbatch comprises the modified butadiene rubber and silica. By kneading silica with the modified butadiene rubber before kneading with rubber components other than the modified butadiene rubber, a hydrophilic group on the surface of silica can be bonded to the modified butadiene rubber more efficiently.

The content of the modified butadiene rubber in the masterbatch is preferably not less than 50% by mass, more preferably not less than 100% by mass based on the whole modified butadiene rubber from the viewpoint that an effect of the present invention can be exhibited more.

The content of silica in the masterbatch is preferably not less than 50% by mass, more preferably not less than 100% by mass based on the whole silica from the viewpoint that an effect of the present invention can be exhibited more.

To the masterbatch can be optionally compounded a silane coupling agent, oil, and the like in addition to the modified butadiene rubber and silica. When the silane coupling agent is compounded, the content thereof based on silica is the same as the above-mentioned content of the silane coupling agent based on silica.

An extrusion temperature in the X-kneading step is preferably 140° to 170° C., more preferably 150° to 167° C., further preferably 155° to 165° C., for the reason that the bonding of the modified butadiene rubber to silica can be accelerated sufficiently.

A kneading time in the X-kneading step is not limited particularly, and is preferably 2.0 to 4.0 minutes, more preferably 2.5 to 3.5 minutes, further preferably 2.7 to 3.2 minutes, for the reason that a kneaded product in which silica is dispersed satisfactorily can be obtained efficiently.

The above-mentioned kneading time is a period of time taken from the initiation of the kneading until the kneading temperature reaches the extrusion temperature. In the X-kneading step, it is preferable that after the extrusion temperature was reached, the kneading is continued for 1 to 5 minutes while maintaining the extrusion temperature, for the reason that the bonding of the modified butadiene rubber to silica can be accelerated more.

A kneading temperature and a kneading time in the Y-kneading step are not limited particularly, and the conditions employed in conventional base kneading step can be used as they are.

A pure water contact angle of the rubber composition according to the present invention is 125° to 140° C., preferably 128° to 140° C., more preferably 130° to 140° C. Here, the pure water contact angle means an angle of an end part of a pure water droplet to a surface of a rubber composition when pure water is dropped on the surface of the rubber composition held horizontally using a thin glass tube, or the like. The larger the contact angle is, the higher the water repellency is. This contact angle can be measured with a contact angle measuring device.

An amount of filler gel in the rubber composition according to the present invention is preferably not less than 45% by mass, more preferably not less than 55% by mass. The filler gel in the rubber composition is one formed by bonding of the filler such as silica to the rubber component, and in the present invention, is an index indicating an amount of bond of the hydrophilic group on the surface of silica to the rubber component such as the modified butadiene rubber being capable of bonding to silica. Namely, the larger the amount of filler gel in the rubber composition is, the larger the amount of bond of the hydrophilic group on the surface of silica to the modified butadiene rubber is. An upper limit of the amount of the filler gel is not limited particularly, and is preferably not more than 65% by mass.

A method for measuring the amount of filler gel in the rubber composition is not limited particularly. Since the filler gel is insoluble in a solvent being capable of dissolving the rubber component, there is a method of measuring the amount of filler gel by dipping an unvulcanized rubber composition in a rubber solvent to dissolve, in the solvent, the rubber component which has not been bonded to the filler, recovering the insoluble filler gel, and then measuring its amount. The amount of filler gel indicates an amount in 100% by mass of unvulcanized rubber composition.

The pneumatic tire of the present invention can be produced by a usual method using the above-mentioned rubber composition. Namely, the unvulcanized rubber composition is subjected to extrusion processing to a shape of a specific member of a tire and then, laminating the extruded member together with other tire members and molding them by a usual method on a tire molding machine, thus forming an unvulcanized tire. The tire of the present invention can be obtained by heating and compressing this unvulcanized tire in a vulcanizer. The rubber composition is one which can inhibit clogging of snow and sticking of snow, and therefore, is used preferably for a tread and/or a side wall to be provided on an outer periphery of a tire and more preferably for a tread in which inhibition of clogging of snow and sticking of snow is demanded more.

The tire of the present invention is preferably a pneumatic tire, and a pneumatic tire with a tread particularly composed of the above-mentioned rubber composition is a tire inhibiting clogging of snow and sticking of snow without depending on a tread pattern form, and therefore, is applied preferably to a tire for winter use such as a studless tire, a snow tire, and the like, more preferably to a studless tire requiring grip performance on ice.

EXAMPLE

The present invention is then explained by means of Examples, but is not limited to the Examples.

Various chemicals used in Examples and Comparative Examples are collectively shown below.

NR: TSR20
Modified BR: Modified butadiene rubber synthesized in accordance with the following Preparation of modified BR
BR: BR1220 available from ZEON CORPORATION (unmodified BR, cis content: 96% by mass)
Carbon black: DIABLACK I available from Mitsubishi Chemical Corporation (ASTM No. N220, $N_2SA$: 114 $m^2/g$, DBP: 114 ml/100 g)
Silica: Ultra Jill VN3 available from Evonik Degussa GmbH ($N_2SA$: 175 $m^2/g$, average primary particle size: 15 nm)
Silane coupling agent: Si75 available from Evonik Degussa GmbH (bis(3-triethoxysilylpropyl)disulfide)
Wax: SUNNOC N available from Ouchi Shinko Chemical Industrial Co., Ltd.
Antioxidant: Antigen 6C (N-(1,3-dimethylbutyl)-N'-phenyl-p-phenylenediamine) available from Sumitomo Chemical Company, Limited
Oil: PROCESS X-140 (aroma oil) available from JX Nippon Oil & Energy Corporation
Stearic acid: Stearic acid "Tsubaki" available from NOF CORPORATION Zinc oxide: ZINC FLOWER No. 1 available from Mitsui Mining & Smelting Co., Ltd.
Sulfur: Powdered sulfur available from Karuizawa Iou Kabushiki Kaisha
Vulcanization accelerator: NOCCELER CZ (N-cyclohexyl-2-benzothiazolylsulfenamide) available from Ouchi Shinko Chemical Industrial Co., Ltd.

Preparation of Modified BR
Synthesis of Butadiene Rubber

A cyclohexane solution containing 0.18 mmol of neodymium versatate, a toluene solution containing 3.6 mmol of methyl alumoxane, a toluene solution containing 6.7 mmol of hydrogenated diisobutyl aluminum, a toluene solution containing 0.36 mmol of trimethylsilyl iodide and 0.90 mmol of 1,3-butadiene were subjected to reaction and maturing at 30° C. for 60 minutes to obtain a catalyst composition (iodine atom/lanthanoid-containing compound (molar ratio=2.0). Subsequently, 2.4 kg of cyclohexane and 300 g of 1,3-butadiene were poured into a 5-liter autoclave subjected to replacement with nitrogen. Then the catalyst composition was poured into the autoclave, followed by 2-hour polymerization reaction at 30° C. to obtain a butadiene rubber solution. Here, a conversion factor of the poured 1,3-butadiene was substantially 100%.

Here, in order to measure values of various physical properties of the butadiene rubber, namely unmodified butadiene rubber, 200 g of butadiene rubber solution was sampled from the butadiene rubber solution, and to this butadiene rubber solution was added a methanol solution containing 1.5 g of 2,4-di-tert-butyl-p-cresol. After termination of the polymerization reaction, desolvating was performed by steam stripping, followed by drying with rolls of 110° C. The obtained dried product was a butadiene rubber.

With respect to the obtained butadiene rubber, various physical properties thereof were measured by the following measuring methods. As a result, a Mooney viscosity ($ML_{1+4}$ (100° C.)) was 12, a molecular weight distribution (Mw/Mn) was 1.6, an amount of cis-1,4 bonds was 99.2% by mass, and an amount of 1,2-vinyl bonds was 0.21% by mass.

Mooney Viscosity ($ML_{1+4}$ (100° C.))

A Mooney viscosity was measured in accordance with JIS K 6300 by using an L-rotor under the conditions of preheating of one minute, a rotor operation time of four minutes and a temperature of 100° C.

Molecular Weight Distribution (Mw/Mn)

The molecular weight distribution was measured using a gel permeation chromatograph (HLC-8120GPC available from TOSO CORPORATION) and a differential refractometer as a detector under the following conditions and calculated in terms of standard polystyrene.

Column: Two columns, Brand name "GMHHXL" (available from TOSO CORPORATION)
Column temperature: 40° C.
Moving phase: Tetrahydrofuran
Flow rate: 1.0 ml/min
Sample concentration: 10 mg/20 ml Amount of Cis-1,4 Bonds and Amount of 1,2-Vinyl Bonds An amount of cis-1,4 bonds and an amount of 1,2-vinyl bonds were measured by $^1$H-NMR analysis and $^{13}$C-NMR analysis. For the NMR analyses, a brand name "EX-270" available from JEOL Ltd. was used. Specifically in the $^1$H-NMR analysis, a ratio of 1,4 bonds to 1,2 bonds in the butadiene rubber was calculated from signal intensities at 5.30 to 5.50 ppm (1,4 bonds) and 4.80 to 5.01 ppm (1,2 bonds). Further, in the $^{13}$C-NMR analysis, a ratio of cis-1,4 bonds to trans-1,4 bonds in the butadiene rubber was calculated from signal intensities at 27.5 ppm (cis-1,4 bonds) and 32.8 ppm (trans-1,4 bonds). From these calculated ratios, an amount of cis-1,4 bonds (% by mass) and an amount of 1,2-vinyl bonds (% by mass) were calculated.

Synthesis of Modified Butadiene Rubber

In order to obtain a modified butadiene rubber, the butadiene rubber solution was subjected to the following treatment. To the butadiene rubber solution kept at a temperature of 30° C. was added a toluene solution containing 1.71 mmol of 3-glycidoxipropyltrimethoxysilane, followed by 30-minute reaction to obtain a reaction solution. Then, to this reaction solution was added a toluene solution containing 1.71 mmol of 3-aminopropyltriethoxysilane, followed by 30-minute stirring. Subsequently, to this reaction solution was added a toluene solution containing 1.28 mmol of tetraisopropyltitanate, followed by 30-minute stirring. Thereafter, in order to terminate the polymerization reaction, a methanol solution containing 1.5 g of 2,4-di-tert-butyl-p-cresol was added, and the solution was obtained as the modified butadiene rubber solution. Yield thereof was 2.5 kg. Subsequently, to the modified butadiene rubber solution was added 20-liter of aqueous solution adjusted to a pH value of 10 using sodium hydroxide, followed by 2-hour condensation reaction as well as desolvation at 110° C. After this, drying was performed using 110° C. rolls and a dried product was obtained as the modified butadiene rubber.

With respect to the obtained modified butadiene rubber, various physical properties were measured by the following methods (it should be noted that the molecular weight distribution (Mw/Mn) was measured under the same conditions as in the above-mentioned butadiene rubber). A Mooney viscosity ($ML_{1+4}$ (125° C.)) was 46, a molecular weight distribution (Mw/Mn) was 2.4, a cold flow value was 0.3 mg/min, stability with time was 2, and a glass transition temperature was −106° C.

Mooney Viscosity ($ML_{1+4}$ (125° C.))

A Mooney viscosity was measured in accordance with JIS K 6300 by using an L-rotor under the conditions of preheating of one minute, a rotor operation time of four minutes and a temperature of 125° C.

Cold Flow Value

The cold flow value was measured by passing a butadiene rubber through a ¼ inch orifice at a pressure of 3.5 lb/in² at a temperature of 50° C. and then extruding the butadiene rubber. After allowing the butadiene rubber to stand for 10 minutes in order to obtain a stationary state thereof, an extrusion rate was measured, and a measured value was indicated by milligrams per minute (mg/min).

Stability with Time

The stability with time is indicated by a value obtained by measuring a Mooney viscosity ($ML_{1+4}$ (125° C.)) after two-day storage in a 90° C. thermostatic chamber and calculating using the following formula. The smaller the value is, the more satisfactory the stability with time is.

$$\text{[Mooney viscosity } (ML_{1+4}(125°\text{ C.})) \text{ after two-day storage in a 90° C. thermostatic chamber]} - \text{[Mooney viscosity } (ML_{1+4}(125°\text{ C.})) \text{ measured just after synthesis]} \quad \text{Formula:}$$

Glass Transition Temperature

The glass transition temperature was measured in accordance with JIS K 7121 using a differential scanning calorimeter (Q200) available from TA Instruments, Japan while heating up at a temperature elevating rate of 10° C./min, and was obtained as a glass transition initiating temperature.

Examples and Comparative Examples

Each of unvulcanized rubber compositions was obtained by performing an X-kneading step and a Y-kneading step using a 1.7-liter enclosed Banbury mixer and a final kneading step using an open roll in accordance with the compounding formulations and X-kneading conditions shown in Table 1. A "keeping time" in the X-kneading step is a time period during which the kneading is continued while keeping the extrusion temperature after the extrusion temperature was reached. In addition, the Y-kneading step was performed under the conditions of an extrusion temperature of 150° C. and a kneading time of five minutes, and the final kneading step was performed under the conditions of kneading at 80° C. for three minutes. Further the obtained unvulcanized rubber compositions were subjected to press-vulcanization at 170° C. for 12 minutes to obtain each rubber composition for test.

Furthermore, the unvulcanized rubber composition was extrusion-molded into a shape of a tire tread using an extruder with an extrusion nozzle having a specific shape, and the extrudate was laminated with other tire members to form an unvulcanized tire, followed by press-vulcanization at 170° C. for 12 minutes to produce a test tire (size: 195/65R15, studless tire).

The following evaluations were made using the obtained unvulcanized rubber compositions, vulcanized rubber compositions and test tires. The results of the evaluations are shown in Table 1.

Amount of Filler Gel 0.5 Gram of each unvulcanized rubber composition was cut into pieces of 1 mm square, which were put into a cage of 30 mm square made of a stainless steel metal net of 200 mesh and were dipped into 50 ml of toluene together with the cage, followed by allowing to stand at 25° C. for 48 hours in a dark place. Thereafter, the solids in the cage were filtrated with a glass fiber filter (pore size: 0.1 μm) and thus, matters insoluble in toluene were separated. After this, the insoluble matters were subjected to vacuum drying at 25° C. to prepare a filler gel. A mass of the obtained filler gel was measured to calculate an amount of the filler gel in the unvulcanized rubber composition.

Pure Water Contact Angle

A contact angle of a liquid droplet on each vulcanized rubber composition was measured with a contact angle measuring device (CA-A type device available from Kyowa Interface Science Co., Ltd.). Pure water was used as the liquid droplet, and measurement was done five minutes after the dropping. The larger the contact angle is, the more excellent the water repellency of the vulcanized rubber composition is.

Abrasion Resistance

Test tires were mounted on all wheels of a vehicle (2000 cc domestic FF car). A depth of a groove of a tire tread part after 8000 km running was measured, and a running distance when the depth was reduced by 1 mm was obtained. The result is indicated by an index. The larger the index is, the better the abrasion resistance is. The index was calculated by the following equation.

$$\text{(Index of abrasion resistance)} = \text{(Running distance when a depth of a tire groove is reduced by 1 mm)}/\text{(Running distance when a depth of a tire groove of Comparative Example 3 is reduced by 1 mm)} \times 100$$

Wet Grip Performance

Test tires were mounted on all wheels of a vehicle (2000 cc domestic FF car). A breaking distance at an initial speed of 100 km/hr on a wet asphalt road was obtained. The result is indicated by an index. The larger the index is, the better the wet grip performance is. The index was calculated by the following equation.

$$\text{(Index of wet grip performance)} = \text{(Breaking distance of Comparative Example 3)}/\text{(Breaking distance of each compounding formulation)} \times 100$$

Performance on Ice and Snow

The test tires were mounted on a 2000 cc domestic FR car. In-vehicle running on ice and snow surface was carried out under the following conditions, and performance on ice and snow was evaluated. In the evaluation of performance on ice and snow, the car was run on an ice and snow surface and a lock brake was applied at a speed of 30 km/hr. A stopping distance required for stopping the car after putting on the lock brake (stopping distance on ice, stopping distance on snow) was measured, and was indicated by an index calculated by the following equation. The larger the index is, the better the performance on ice and snow (grip performance on ice and snow) is. When the index exceeds 100, it can be said that the performance on ice and snow has been improved.

$$\text{(Index of breaking performance [performance on ice and snow])} = \text{(Stopping distance of Comparative Example 3)}/\text{(Stopping distance of each compounding formulation)} \times 100$$

(on ice) Test site: Test course at Nayoro, Hokkaido, Air temperature: −1° C.−−6° C.
(on snow) Test site: Test course at Nayoro, Hokkaido, Air temperature: −2° C.−−10° C.

Clogging of Snow and Sticking of Snow

The test tires were mounted on a test vehicle (2000 cc domestic FR car), and in-vehicle running on snow surface was carried out. After the running, clogging of snow and sticking of snow on the lateral grooves of the test tires were observed with naked eyes, and were evaluated on the basis of 5 points. The larger the point is, the higher the effect of inhibiting clogging of snow and sticking of snow is. In the case of 4 points or more, the result of the test indicates that clogging of snow and sticking of snow have been inhibited. The test was performed at the test course of Sumitomo Rubber Industries, Ltd. in Nayoro, Hokkaido, and air temperature on snow was −2° C.-−10° C.

TABLE 1

|  | Example | | Com. Ex. | | |
|---|---|---|---|---|---|
|  | 1 | 2 | 1 | 2 | 3 |
| Compounding amount (part by mass) | | | | | |
| X-kneading | | | | | |
| NR | — | — | 50 | — | 50 |
| Modified BR | 50 | 50 | 50 | — | — |
| BR | — | — | — | 50 | 50 |
| Carbon black | — | — | 10 | — | 10 |
| Silica | 40 | 40 | 50 | 40 | 50 |
| Silane coupling agent | 4 | 4 | 5 | 4 | 5 |
| Wax | — | — | 2 | — | 2 |
| Antioxidant | — | — | 2 | — | 2 |
| Oil | 10 | 10 | 30 | 10 | 30 |
| Stearic acid | — | — | 2 | — | 2 |
| Zinc oxide | — | — | 2 | — | 2 |
| Extrusion temperature (° C.) | 150 | 150 | 150 | 150 | 150 |
| Kneading time (min) | 6 | 6 | 6 | 6 | 5 |
| Keeping time (min) | 1 | 1 | 1 | 1 | — |
| Y-kneading | | | | | |
| NR | 50 | 50 | — | 50 | — |
| Carbon black | 10 | 10 | — | 10 | — |
| Silica | 10 | 10 | — | 10 | — |
| Silane coupling agent | 1 | 1 | — | 1 | — |
| Wax | 2 | 2 | — | 2 | — |
| Antioxidant | 2 | 2 | — | 2 | — |
| Oil | 20 | 20 | — | 20 | — |
| Stearic acid | 2 | 2 | — | 2 | — |
| Zinc oxide | 2 | 2 | — | 2 | — |
| F-kneading | | | | | |
| Sulfur | 1 | 1 | 1 | 1 | 1 |
| Vulcanization accelerator | 2 | 2 | 2 | 2 | 2 |
| Evaluation | | | | | |
| Amount of filler gel (% by mass) | 48 | 61 | 39 | 40 | 31 |
| Contact angle of pure water (°) | 129 | 135 | 122 | 123 | 120 |
| Abrasion resistance index | 107 | 105 | 103 | 102 | 100 |
| Wet grip performance index | 103 | 105 | 100 | 101 | 100 |
| Index of performance on ice and snow | 112 | 120 | 103 | 105 | 100 |
| Clogging of snow and sticking of snow | 4.0 | 5.0 | 3.5 | 3.5 | 3.0 |

From the results shown in Table 1, it is seen that when using the tire having the tread composed of the rubber composition which comprises the rubber component comprising the modified butadiene rubber and silica and has a pure water contact angle within a predetermined range, the tire inhibiting clogging of snow and sticking of snow and having good performance on ice and snow without depending on the tread pattern form can be obtained while maintaining wet grip performance and abrasion resistance.

What is claimed is:

1. A tire composed of a rubber composition which comprises a rubber component comprising a modified butadiene rubber and silica and has a pure water contact angle of from 125° to 140°,
    wherein the rubber composition comprises the modified butadiene rubber and silica as a masterbatch, and
    wherein the masterbatch is made by a kneading step for kneading each of the components, said kneading step comprising:
        an X-kneading step for preparing the masterbatch comprising the modified butadiene rubber and silica,
        a Y-kneading step of adding the remaining compounding agents and additives other than vulcanizing agents and vulcanization accelerators to the masterbatch and then kneading a resultant mixture, and
        a final F-kneading step of adding vulcanizing agents and vulcanization accelerators to the kneaded product obtained in the base kneading step and then kneading a resultant mixture.

2. The tire of claim 1, wherein an amount of filler gel in the rubber composition is not less than 45% by mass.

* * * * *